United States Patent
Zhevelev

(10) Patent No.: US 9,213,092 B2
(45) Date of Patent: Dec. 15, 2015

(54) SYSTEMS AND METHODS FOR DETECTING A CHANGE IN POSITION OF AN OBJECT

(71) Applicant: Tyco Fire & Security GmbH, Neuhausen am Rheinfall (IL)

(72) Inventor: Boris Zhevelev, Rishon le Zion (IL)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 210 days.

(21) Appl. No.: 13/905,542

(22) Filed: May 30, 2013

(65) Prior Publication Data

US 2013/0328712 A1 Dec. 12, 2013

Related U.S. Application Data

(60) Provisional application No. 61/658,536, filed on Jun. 12, 2012.

(51) Int. Cl.

| G01S 13/00 | (2006.01) |
|---|---|
| G01S 13/50 | (2006.01) |
| G01S 13/32 | (2006.01) |
| G01S 13/536 | (2006.01) |
| G01S 13/48 | (2006.01) |

(52) U.S. Cl.
CPC ............... *G01S 13/50* (2013.01); *G01S 13/003* (2013.01); *G01S 13/32* (2013.01); *G01S 13/536* (2013.01); *G01S 13/48* (2013.01)

(58) Field of Classification Search
CPC ....... G01S 13/003; G01S 13/32; G01S 13/48; G01S 13/50; G01S 13/536
USPC .......................................................... 342/28
See application file for complete search history.

(56) References Cited

U.S. PATENT DOCUMENTS

| 4,095,475 A * | 6/1978 | Buckley ................. G01B 15/00 367/87 |
|---|---|---|
| 4,485,864 A | 12/1984 | Carrell et al. |
| 7,804,441 B1 | 9/2010 | DeChiaro, Jr. |
| 2006/0023571 A1* | 2/2006 | Uebo et al. ..................... 367/101 |
| 2006/0202823 A1 | 9/2006 | Yukl |
| 2008/0318691 A1* | 12/2008 | Rofougaran et al. ........... 463/42 |
| 2009/0224962 A1* | 9/2009 | Pao et al. ....................... 342/179 |
| 2011/0266463 A1* | 11/2011 | Einziger .............. H05B 6/6402 250/492.1 |
| 2011/0281543 A1* | 11/2011 | White et al. ................... 455/337 |
| 2012/0081337 A1* | 4/2012 | Camp, Jr. .............. G06F 3/0436 345/177 |

OTHER PUBLICATIONS

Patent Cooperation Treaty, International Search Report, mailed Sep. 26, 2013, for International Application No. PCT/IL2013/050500.

* cited by examiner

*Primary Examiner* — Timothy A Brainard
(74) *Attorney, Agent, or Firm* — HoustonHogle, LLP

(57) ABSTRACT

A system for detecting a change in position of at least one object within an at least partially enclosed space, the system including at least one transmitter repeatedly producing at least two mutually distinguishable standing waves in the at least partially enclosed space at mutually exclusive and mutually alternating times, at least one receiver receiving reflected energy of the at least two mutually distinguishable standing waves, the reflected energy from the at least two mutually distinguishable standing waves having mutually different amplitudes which have a difference therebetween, and a computerized processor receiving outputs from the at least one receiver and calculating changes in the difference between the mutually different amplitudes, which changes indicate the change in position of the at least one object.

60 Claims, 8 Drawing Sheets

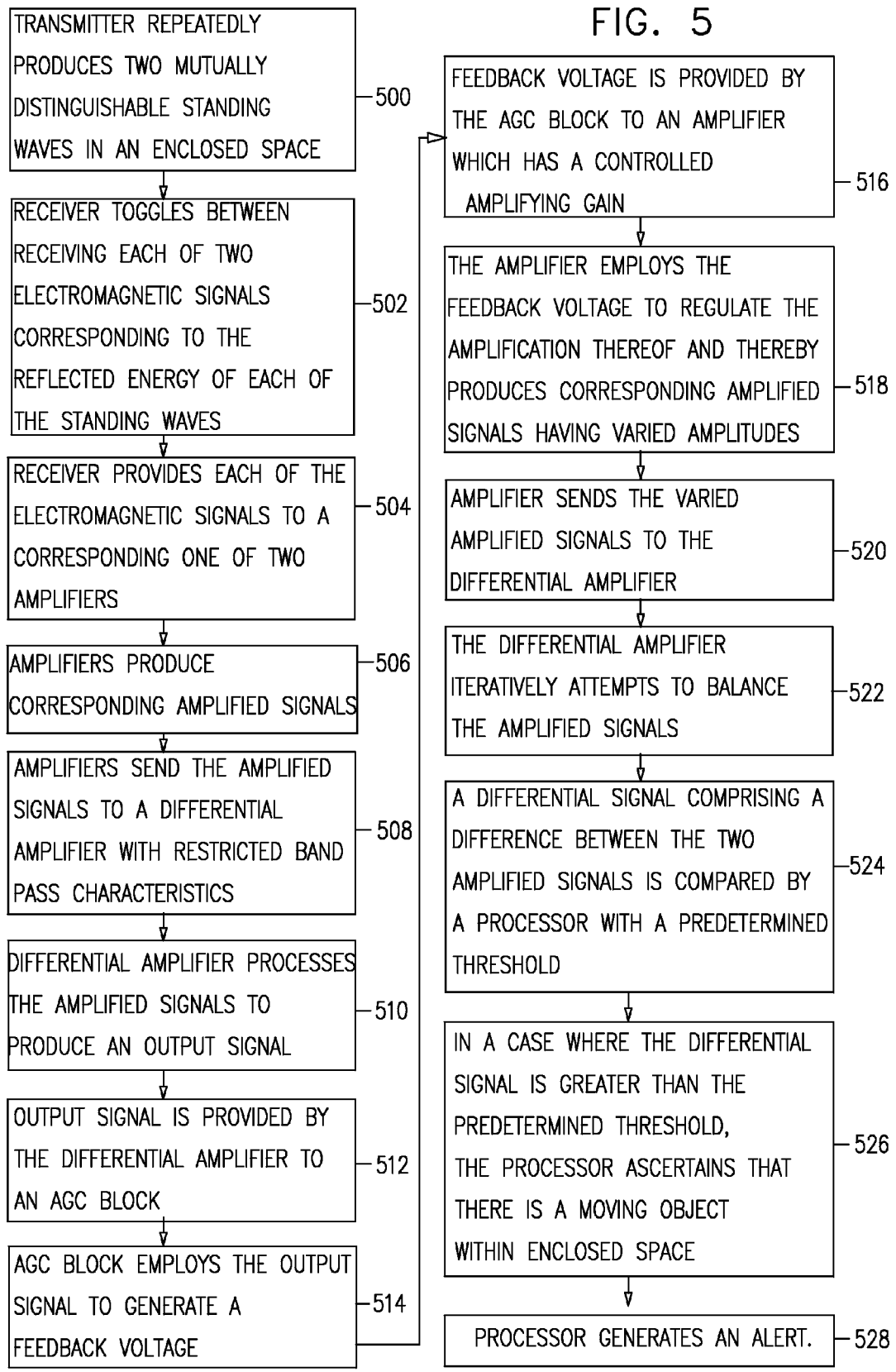

SYSTEMS AND METHODS FOR DETECTING A CHANGE IN POSITION OF AN OBJECT

REFERENCE TO RELATED APPLICATIONS

Reference is made to U.S. Provisional Patent Application Ser. No. 61/658,536 filed Jun. 12, 2012 and entitled "DIFFERENTIAL MICROWAVE MOTION DETECTOR", the disclosure of which is hereby incorporated by reference and priority of which is hereby claimed pursuant to 37 CFR 1.78 (a) (4) and (5)(i).

FIELD OF THE INVENTION

The present invention relates generally to improved systems and methods for detecting a change in position of an object.

BACKGROUND OF THE INVENTION

Microwave (MW) motion detectors typically employ the Doppler effect for detecting motion by generating and transmitting microwaves of a first frequency, which are then reflected from a moving object with a second frequency, different from the first frequency. The difference between the first and second frequencies may be employed to calculate the speed and direction of the moving object.

Motion detectors based on the Doppler effect suffer from various shortcomings. For example, signals originating from the environment such as, for example, those originating from fluorescent lighting, may interfere with the signals generated by the motion detector and thereby may distort the calculation of the speed and direction of the moving object. Indeed, such interference may even cause false detection of moving objects by the detector, or may create a signal stronger than that of the detector, thereby totally obscuring the motion detection capabilities of the detector.

Furthermore, while motion detectors based on the Doppler effect are effective in detecting motion of an object, they are ineffective in detecting a change in location of an object, where the actual movement of the object was not monitored or detected.

The present invention provides systems and methods for detecting a change in the position of an object which overcome the aforementioned limitations.

SUMMARY OF THE INVENTION

The present invention seeks to provide improved systems and methods for detecting a change in position of an object.

There is thus provided in accordance with a preferred embodiment of the present invention a system for detecting a change in position of at least one object within an at least partially enclosed space, the system including at least one transmitter repeatedly producing at least two mutually distinguishable standing waves in the at least partially enclosed space at mutually exclusive and mutually alternating times, at least one receiver receiving reflected energy of the at least two mutually distinguishable standing waves, the reflected energy from the at least two mutually distinguishable standing waves having mutually different amplitudes which have a difference therebetween, and a computerized processor receiving outputs from the at least one receiver and calculating changes in the difference between the mutually different amplitudes, which changes indicate the change in position of the at least one object.

In accordance with a preferred embodiment of the present invention, the at least one transmitter includes two transmitters operative to transmit on at least two different frequencies. Alternatively, the at least one transmitter includes two distinct transmitters.

Preferably, the at least two mutually distinguishable standing waves are transmitted in two mutually exclusive directions. Alternatively, the at least two mutually distinguishable standing waves are transmitted in a single direction.

Preferably, each of the at least two mutually distinguishable standing waves produces a corresponding interference pattern with the at least one object.

Preferably, the at least one receiver is operable for communicating with the at least one transmitter and is also operable to toggle between receiving each of two electromagnetic signals corresponding to reflected energy of the at least two mutually distinguishable standing waves. Preferably, the at least one receiver is also operable for providing each of the two electromagnetic signals to a corresponding one of two amplifiers, which two amplifiers are operable for producing corresponding amplified signals corresponding to the electromagnetic signals.

Preferably, a first amplifier of the two amplifiers has a constant amplifying gain, and a second amplifier of the amplifiers has a controlled amplifying gain. Additionally, the two amplifiers are operable for sending the amplified signals to a differential amplifier, wherein the differential amplifier has restricted band pass characteristics.

Preferably, a restricted bandwidth of the differential amplifier corresponds to frequencies generated by a moving person.

Preferably, the differential amplifier is operable for processing the amplified signals to producing an output signal, the output signal being provided by the differential amplifier to an AGC block. Additionally, the AGC block is operable for employing the output signal for generating a feedback voltage, the feedback voltage being provided by the AGC block to the second amplifier. Additionally, the feedback voltage provided to the second amplifier is operative to control an amplification of a corresponding one of the two electromagnetic signals by the second amplifier, which second amplifier then iteratively produces varied amplified signals having varied amplitudes. Additionally, the varied amplified signals are iteratively sent to the differential amplifier, the differential amplifier being operative to iteratively balance the amplified signals produced by the amplifiers.

Preferably, a reaction time of the AGC block is slower than a fluctuation of the two electromagnetic signals produced by movement of the moving object.

There is also provided in accordance with another preferred embodiment of the present invention a method for detecting a change in position of at least one object within an at least partially enclosed space, the method including repeatedly producing, by at least one transmitter, at least two mutually distinguishable standing waves in the at least partially enclosed space at mutually exclusive and mutually alternating times, receiving, by at least one receiver, reflected energy of the at least two mutually distinguishable standing waves, the reflected energy from the at least two mutually distinguishable standing waves having mutually different amplitudes which have a difference therebetween, and receiving outputs from the at least one receiver and calculating changes in the difference between the mutually different amplitudes, which changes indicate the change in position of the at least one object.

In accordance with a preferred embodiment of the present invention, the at least one transmitter includes two transmitters operative to transmit on at least two different frequencies. Alternatively, the at least one transmitter includes two distinct transmitters.

Preferably, the at least two mutually distinguishable standing waves are transmitted in two mutually exclusive directions. Alternatively, the at least two mutually distinguishable standing waves are transmitted in a single direction.

Preferably, each of the at least two mutually distinguishable standing waves produces a corresponding interference pattern with the at least one object.

Preferably, the at least one receiver is operable for communicating with the at least one transmitter and is also operable to toggle between receiving each of two electromagnetic signals corresponding to reflected energy of the at least two mutually distinguishable standing waves. Preferably, the at least one receiver is also operable for providing each of the two electromagnetic signals to a corresponding one of two amplifiers, which two amplifiers are operable for producing corresponding amplified signals corresponding to the electromagnetic signals.

Preferably, a first amplifier of the two amplifiers has a constant amplifying gain, and a second amplifier of the amplifiers has a controlled amplifying gain. Additionally, the two amplifiers are operable for sending the amplified signals to a differential amplifier, wherein the differential amplifier has restricted band pass characteristics.

Preferably, a restricted bandwidth of the differential amplifier corresponds to frequencies generated by a moving person.

Preferably, the differential amplifier is operable for processing the amplified signals to producing an output signal, the output signal being provided by the differential amplifier to an AGC block. Additionally, the AGC block is operable for employing the output signal for generating a feedback voltage, the feedback voltage being provided by the AGC block to the second amplifier. Additionally, the feedback voltage provided to the second amplifier is operative to control an amplification of a corresponding one of the two electromagnetic signals by the second amplifier, which second amplifier then iteratively produces varied amplified signals having varied amplitudes. Additionally, the varied amplified signals are iteratively sent to the differential amplifier, the differential amplifier being operative to iteratively balance the amplified signals produced by the amplifiers.

Preferably, a reaction time of the AGC block is slower than a fluctuation of the two electromagnetic signals produced by movement of the moving object.

BRIEF DESCRIPTION OF THE DRAWINGS

The present invention will be understood and appreciated more fully from the following detailed description taken in conjunction with the drawings in which:

FIG. 5 is a simplified flowchart illustration of steps in the operation of a computerized signal processor which is part of the system of FIGS. 1A-4.

DETAILED DESCRIPTION OF A PREFERRED EMBODIMENT

Figure 1A:
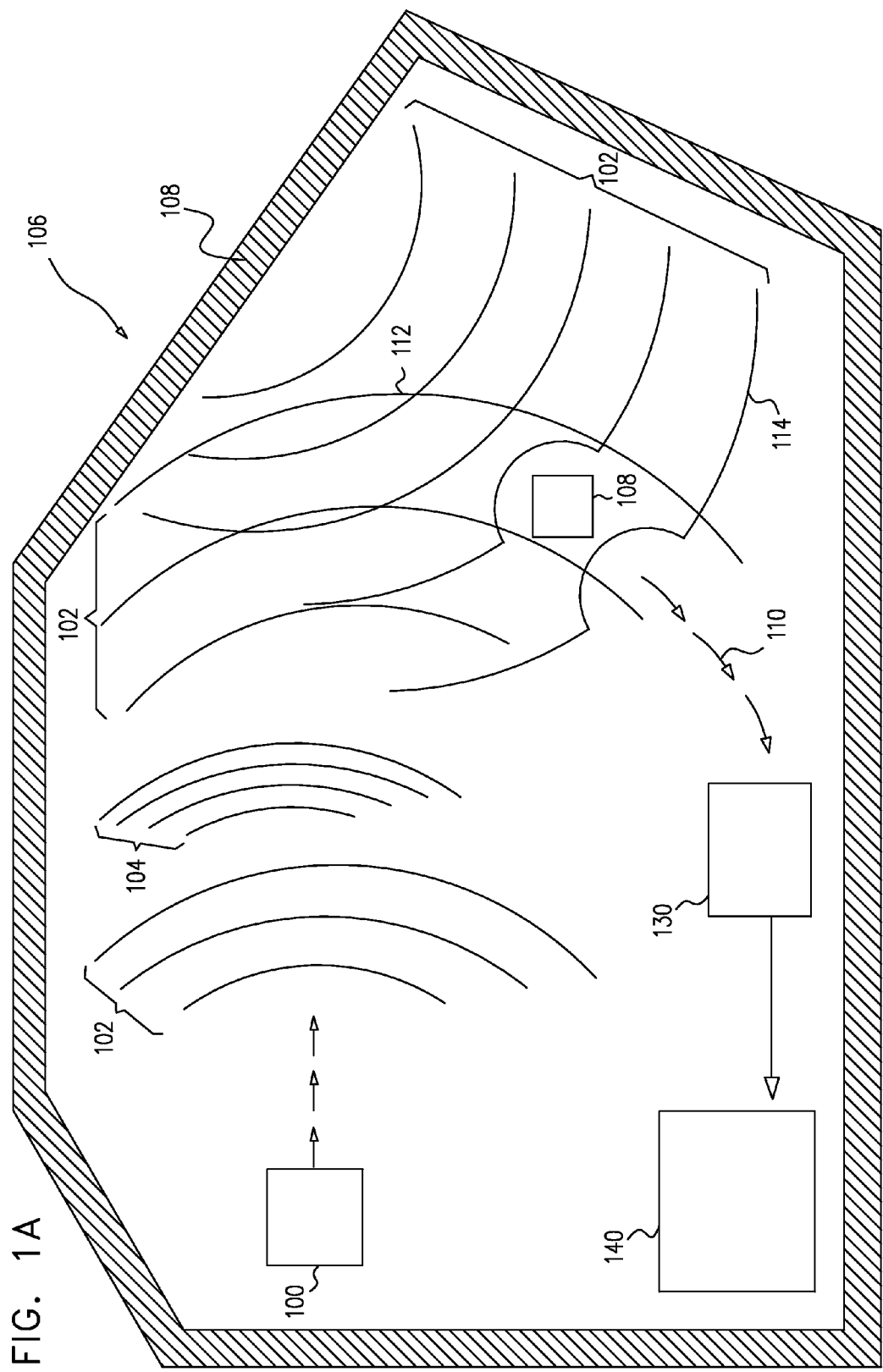
FIGS. 1A and 1B are simplified pictorial illustrations of the operation of a system for detecting a change in position of at least one object within an at least partially enclosed space, constructed and operative in accordance with a preferred embodiment of the present invention.
Figure 1B:
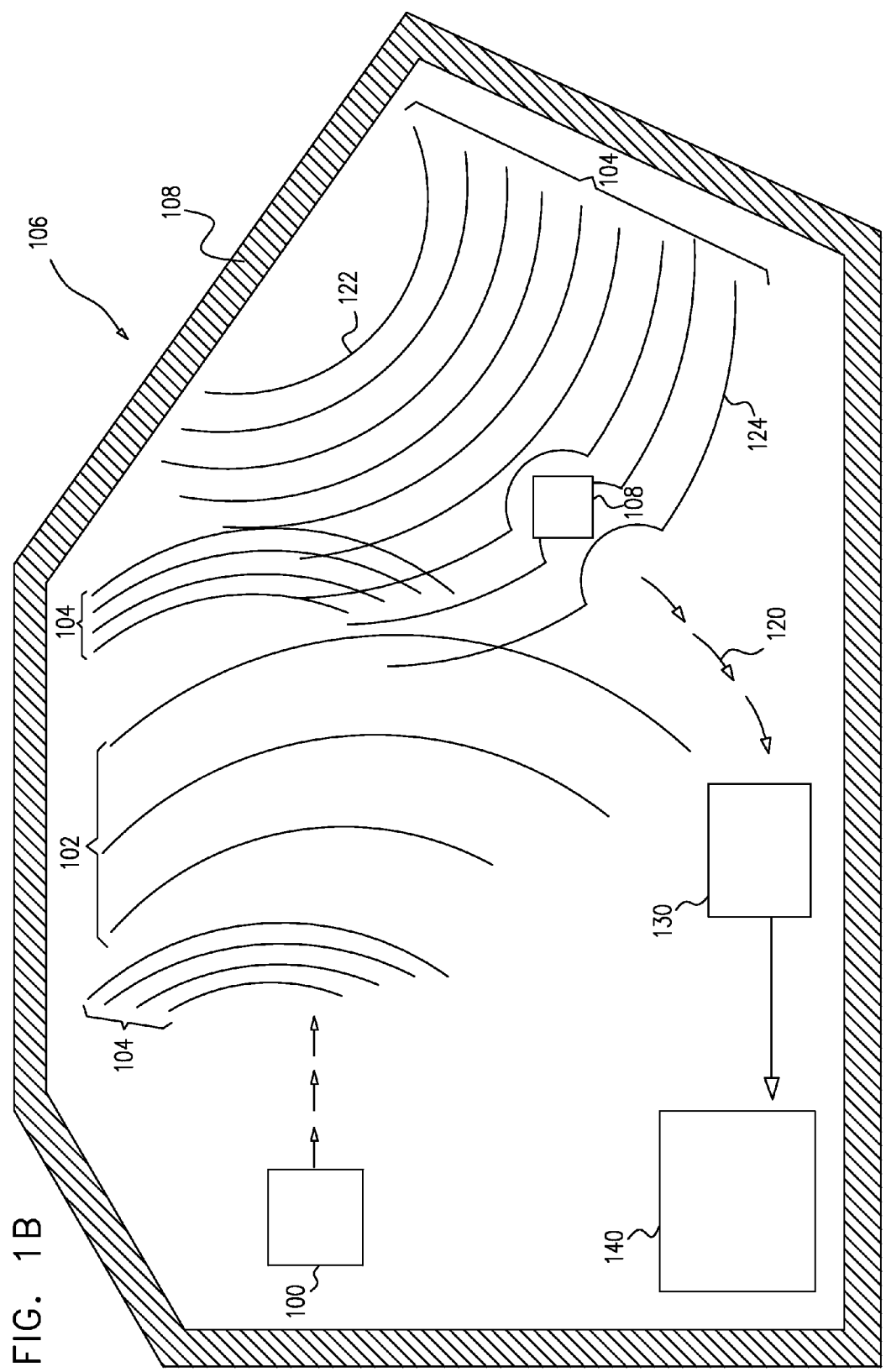

Reference is now made to FIGS. 1A and 1B, which are simplified pictorial illustrations of the operation of a system for detecting a change in position of at least one object within an at least partially enclosed space, constructed and operative in accordance with a preferred embodiment of the present invention.

As shown in FIGS. 1A and 1B, the system preferably includes a transmitter 100 repeatedly producing two mutually distinguishable standing waves 102 and 104 in an at least partially enclosed space 106 at mutually exclusive and mutually alternating times, waves 102 and 104 being transmitted in at least a generally similar direction. Standing waves 102 and 104 are mutually distinguishable preferably by having mutually distinct frequencies. Transmitter 100 may be, for example, an IVS-465 Transceiver commercially available from InnoSenT GmbH of Donnersdorf, Germany.

As further shown in FIG. 1A, upon being reflected from at least one surface 108 of space 106, standing wave 102 produces an interference pattern 110 between a wavefront 112 impinging on surface 108 and a wavefront 114 of standing wave 102 reflected from surface 108. As yet further shown in FIG. 1A, interference pattern 110 is also influenced by the presence of an object 118 located within space 106.

Similarly as shown in FIG. 1B, upon being reflected from at least one surface 108 of space 106, standing wave 104 produces an interference pattern 120 between a wavefront 122 impinging on surface 108 and a wavefront 124 of standing wave 102 reflected from surface 108. As further shown in FIG. 1B, interference pattern 120 is also influenced by the presence of object 118 located within space 106.

The system of FIGS. 1A & 1B also preferably includes at least one receiver 130 receiving reflected energy of standing waves 102 and 104 in the form of corresponding interference patterns 110 and 120, the reflected energy from standing waves 102 and 104 having mutually different amplitudes which have a difference therebetween.

A computerized processor 140 is preferably provided for receiving outputs from receiver 130 and for calculating changes in the difference between the mutually different amplitudes over time, which changes indicate the change in position of an object 118 located in space 106.

Figure 2A:
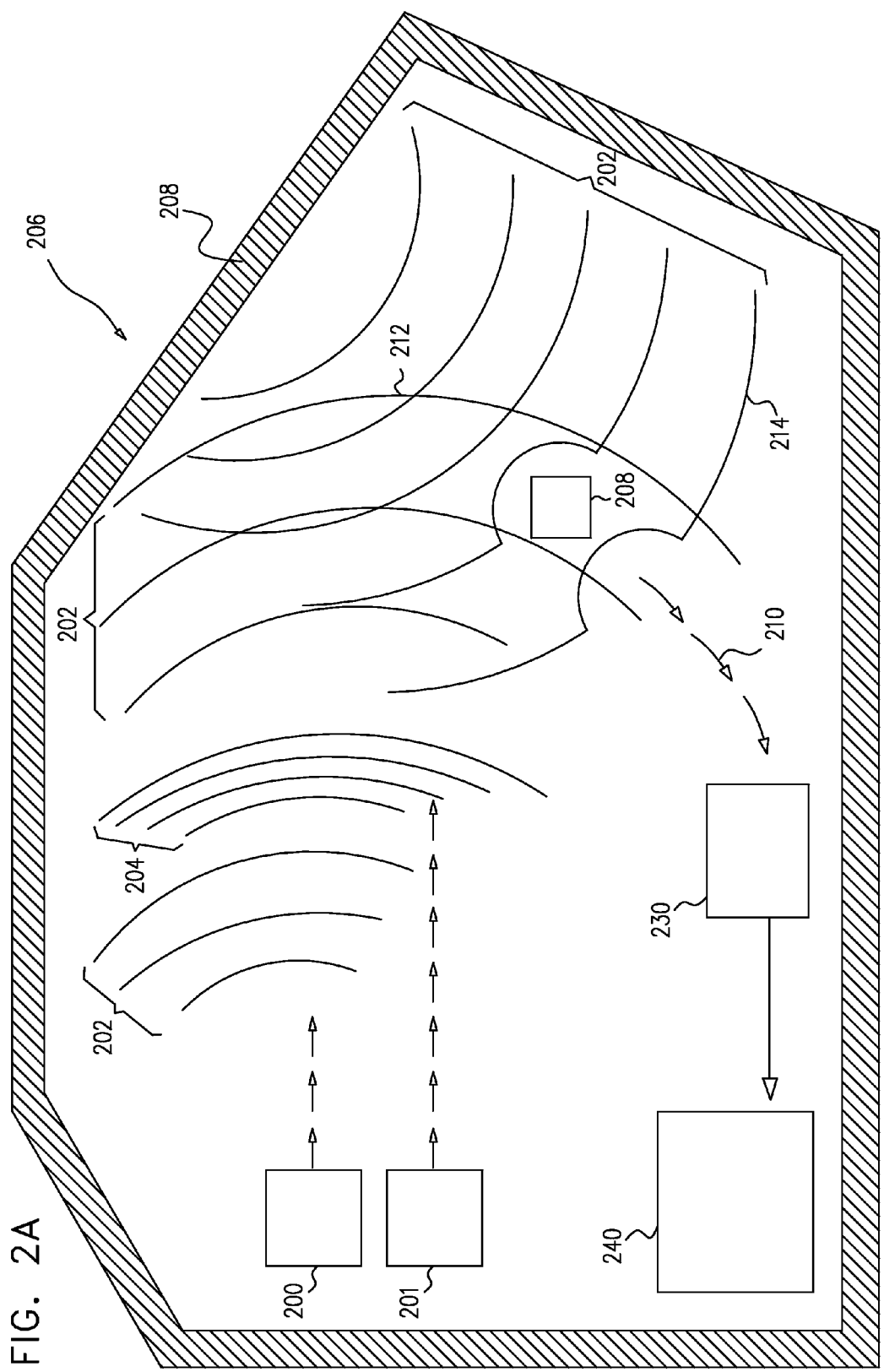
FIGS. 2A and 2B are simplified pictorial illustrations of the operation of the system of FIGS. 1A & 1B, constructed and operative in accordance with an alternative embodiment of the present invention.
Figure 2B:
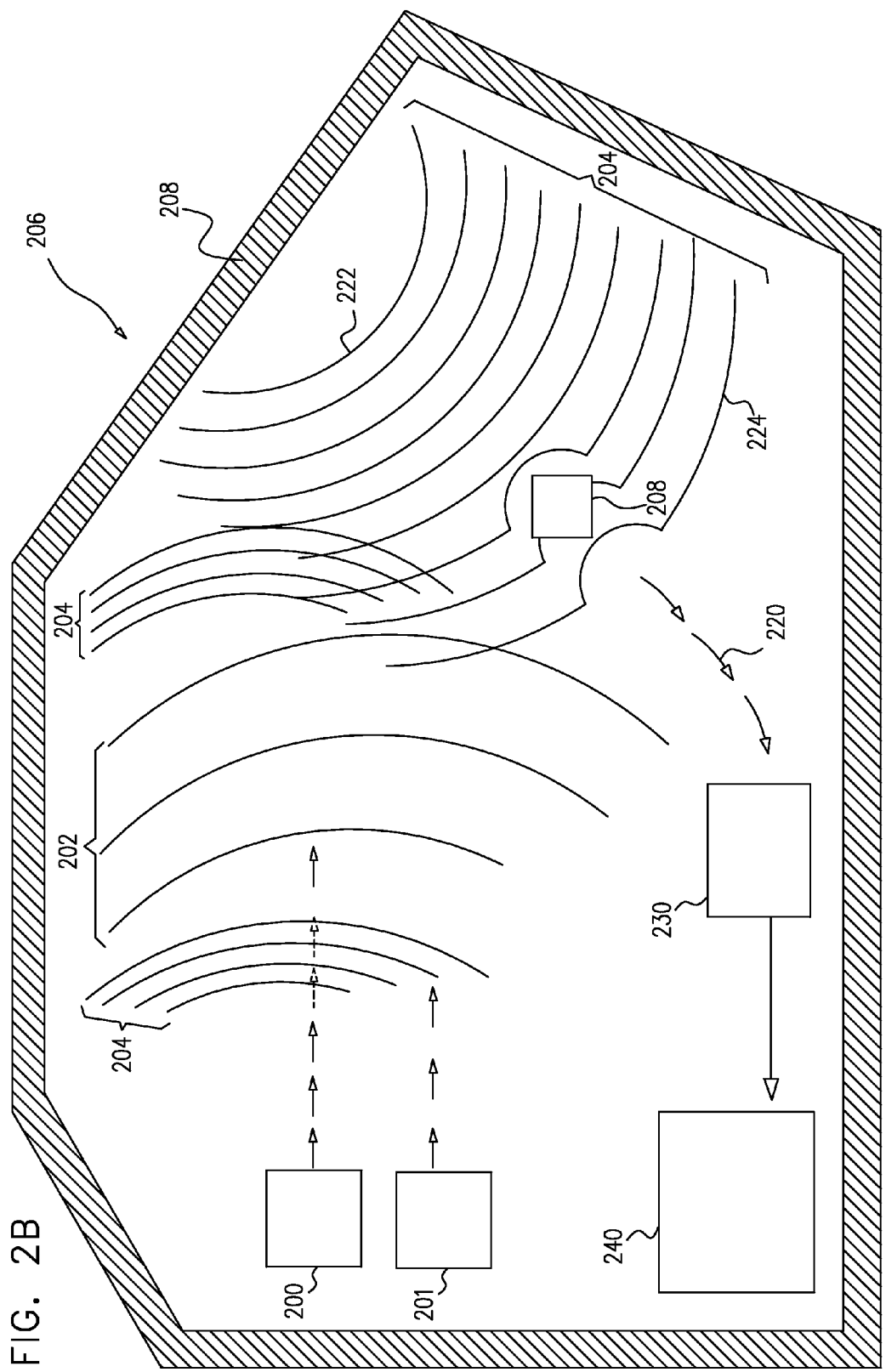

Reference is now made to FIGS. 2A and 2B, which are simplified pictorial illustrations of the operation of the system of FIGS. 1A & 1B, constructed and operative in accordance with an alternative embodiment of the present invention.

As shown in FIGS. 2A and 2B, the system preferably includes a first transmitter 200 and a second transmitter 201, transmitters 200 and 201 repeatedly producing two corresponding mutually distinguishable standing waves 202 and 204 in an at least partially enclosed space 206 at mutually exclusive and mutually alternating times, waves 202 and 204 being transmitted in at least a generally similar direction. Standing waves 202 and 204 are mutually distinguishable preferably by having mutually distinct frequencies.

As further shown in FIG. 2A, upon being reflected from at least one surface 208 of space 206, standing wave 202 produces an interference pattern 210 between a wavefront 212 impinging on surface 208 and a wavefront 214 of standing wave 202 reflected from surface 208. As yet further shown in FIG. 2A, interference pattern 210 is also influenced by the presence of an object 218 located within space 206.

Similarly as shown in FIG. 2B, upon being reflected from at least one surface 208 of space 206, standing wave 204 produces an interference pattern 220 between a wavefront 222 impinging on surface 208 and a wavefront 224 of standing wave 202 reflected from surface 208. As further shown in FIG. 2B, interference pattern 220 is also influenced by the presence of object 218 located within space 206.

The system of FIGS. 2A & 2B also preferably includes at least one receiver 230 receiving reflected energy of standing waves 202 and 204 in the form of corresponding interference patterns 210 and 220, the reflected energy from standing waves 202 and 204 having mutually different amplitudes which have a difference therebetween.

A computerized processor 240 is preferably provided for receiving outputs from receiver 230 and for calculating changes in the difference between the mutually different amplitudes over time, which changes indicate the change in position of an object 218 located in space 206.

Figure 3A:
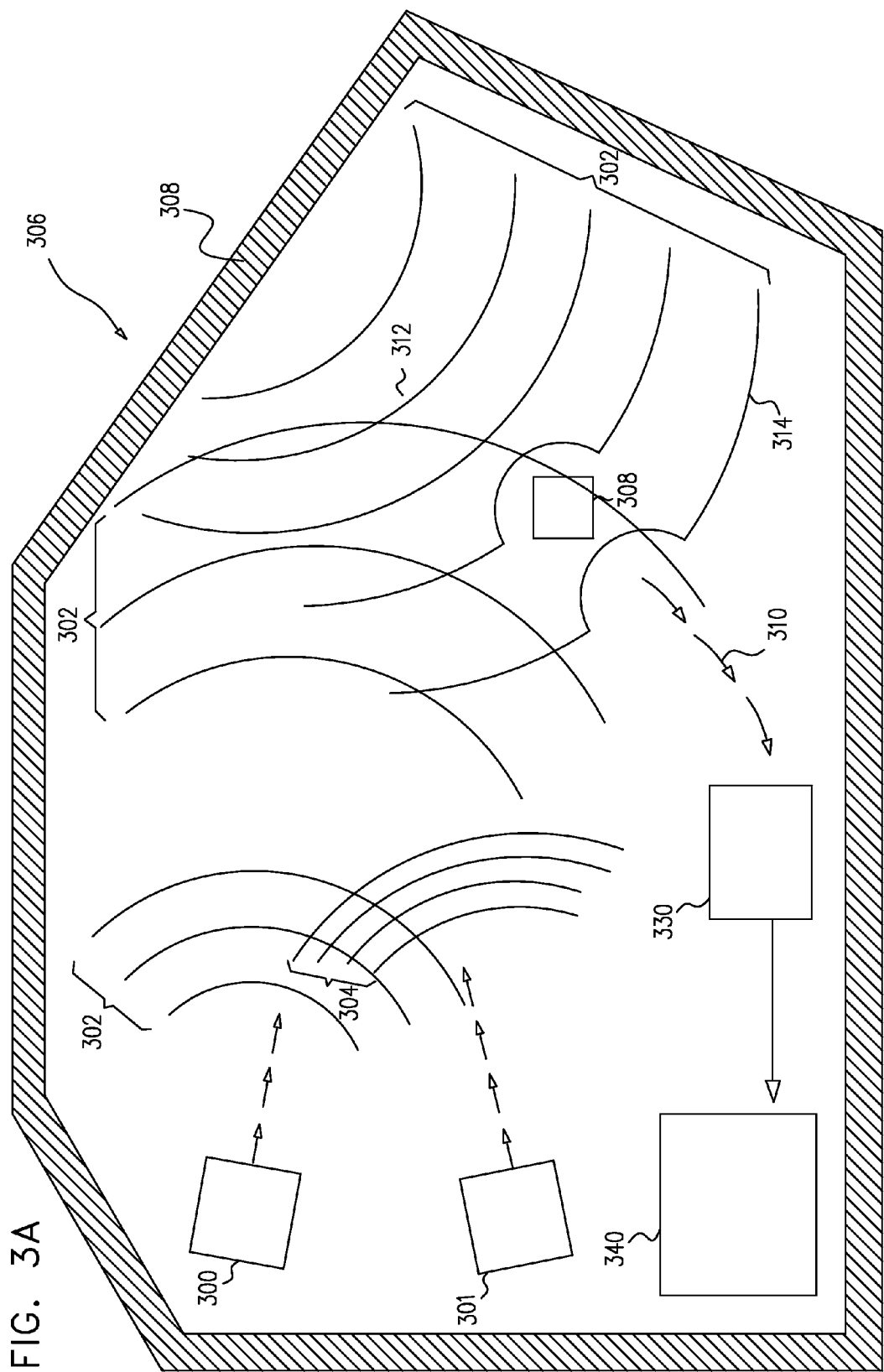
FIGS. 3A and 3B are simplified pictorial illustrations of the operation of the system of FIGS. 1A & 1B, constructed and operative in accordance with yet an alternative embodiment of the present invention.
Figure 3B:
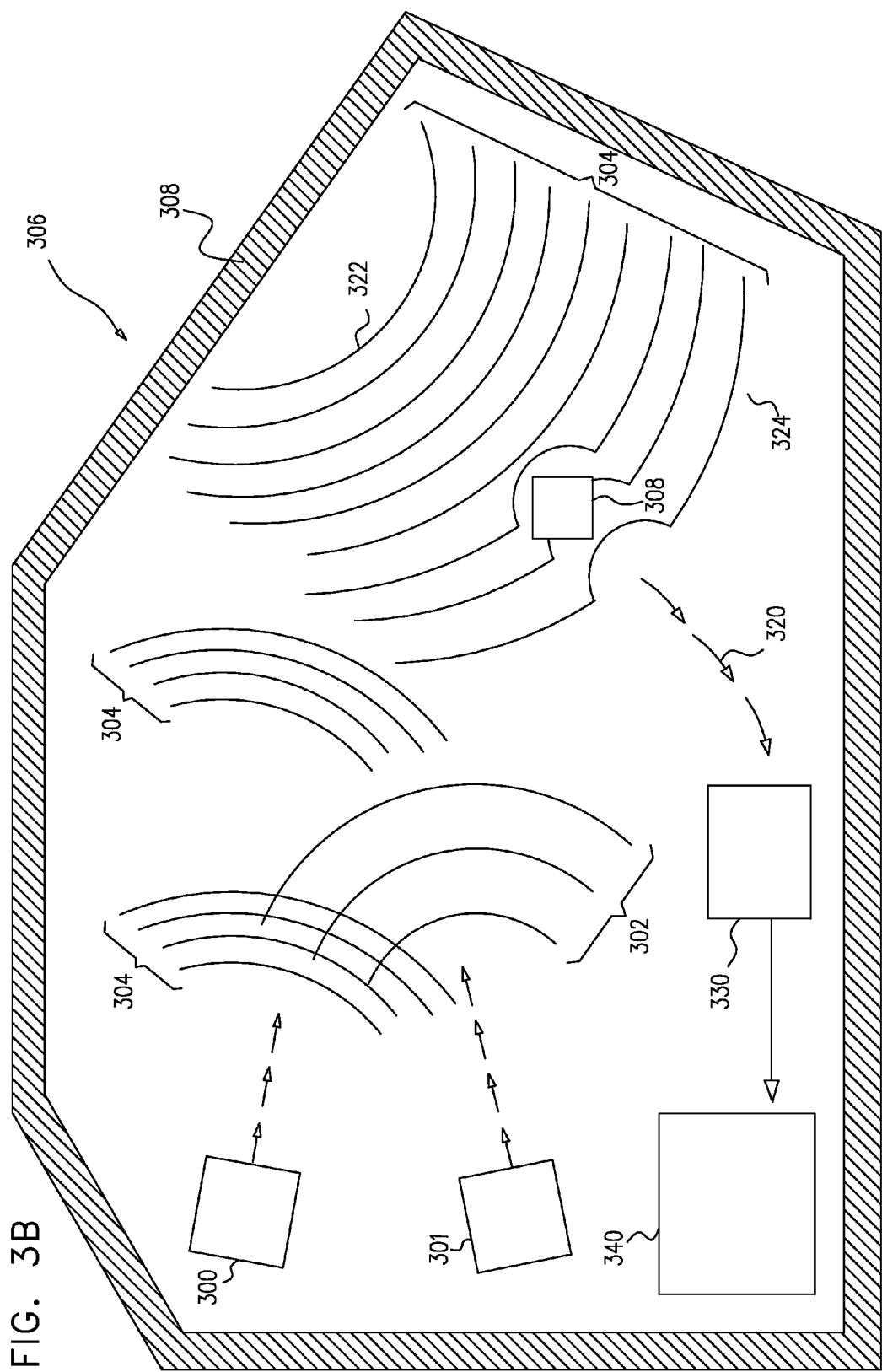

Reference is now made to FIGS. 3A and 3B, which are simplified pictorial illustrations of the operation of the system of FIGS. 1A & 1B, constructed and operative in accordance with yet an alternative embodiment of the present invention.

As shown in FIGS. 3A and 3B, the system preferably includes a first transmitter 300 and a second transmitter 301, transmitters 300 and 301 repeatedly producing two corresponding mutually distinguishable standing waves 302 and 304 in an at least partially enclosed space 306 at mutually exclusive and mutually alternating times, waves 302 and 304 being transmitted in mutually different directions. Standing waves 302 and 304 are mutually distinguishable preferably by having mutually distinct frequencies. It is appreciated that transmitters 300 and 301 may be embodied in a single device, as described hereinabove with regard to FIGS. 1A & 1B.

As further shown in FIG. 3A, upon being reflected from at least one surface 308 of space 306, standing wave 302 produces an interference pattern 310 between a wavefront 312 impinging on surface 308 and a wavefront 314 of standing wave 302 reflected from surface 308. As yet further shown in FIG. 3A, interference pattern 310 is also influenced by the presence of an object 318 located within space 306.

Similarly as shown in FIG. 3B, upon being reflected from at least one surface 308 of space 306, standing wave 304 produces an interference pattern 320 between a wavefront 322 impinging on surface 308 and a wavefront 324 of standing wave 302 reflected from surface 308. As further shown in FIG. 3B, interference pattern 320 is also influenced by the presence of object 318 located within space 306.

The system of FIGS. 3A & 3B also preferably includes at least one receiver 330 receiving reflected energy of standing waves 302 and 304 in the form of corresponding interference patterns 310 and 320, the reflected energy from standing waves 302 and 304 having mutually different amplitudes which have a difference therebetween.

A computerized processor 340 is preferably provided for receiving outputs from receiver 330 and for calculating changes in the difference between the mutually different amplitudes over time, which changes indicate the change in position of an object 318 located in space 306.

Figure 4:
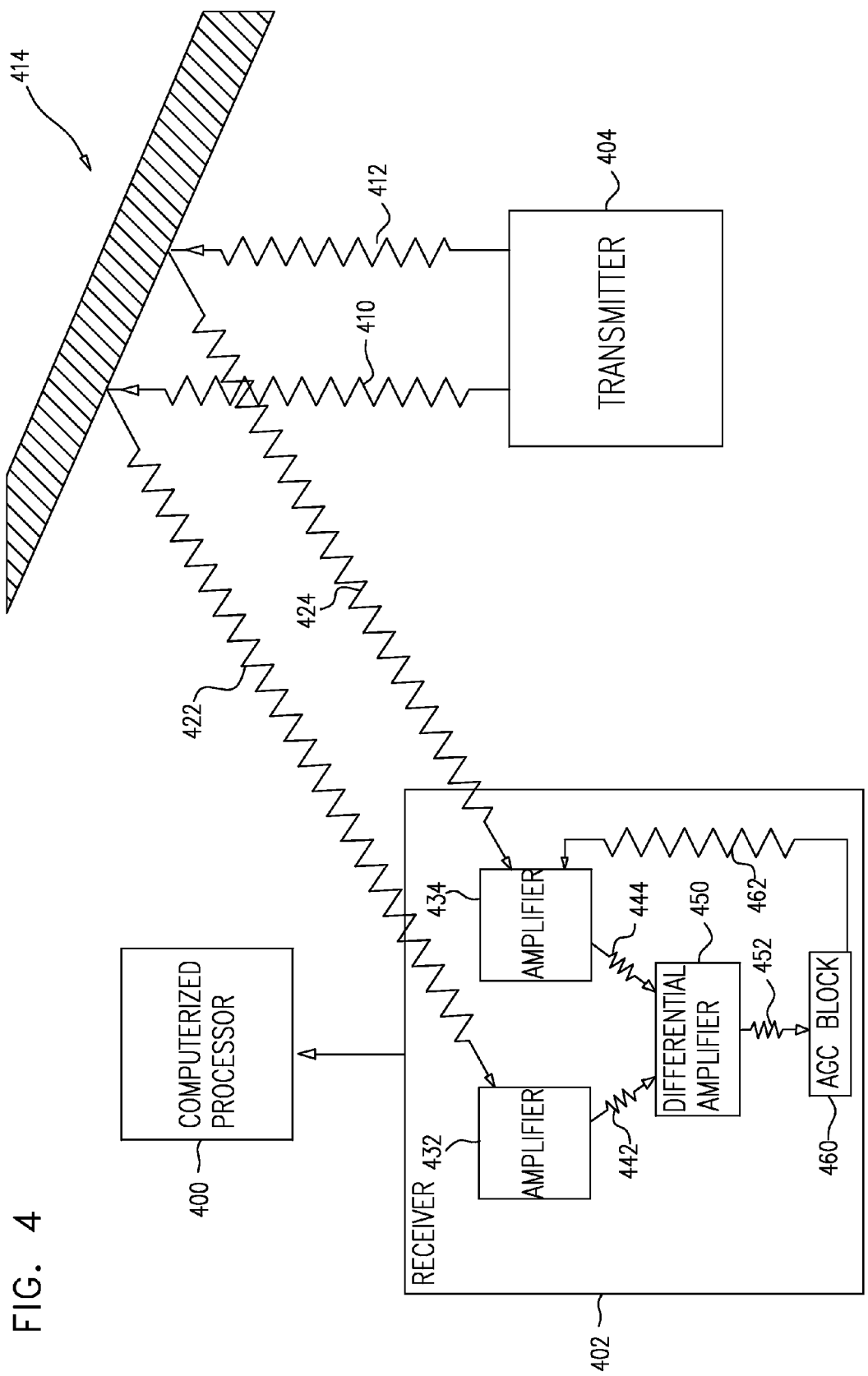
FIG. 4 is a simplified functional block diagram of the system of FIGS. 1A-3B.

Reference is now made to FIG. 4, which is a simplified functional block diagram of the system of FIGS. 1A-3B.

As described hereinabove with regard to FIGS. 1A-3B and as shown in FIG. 4, a computerized processor 400 is preferably provided for receiving outputs from a receiver 402 operable for receiving energy reflected from standing waves in the form of corresponding interference patterns. At least one transmitter 404 communicating with receiver 402 is operable for repeatedly producing two mutually distinguishable standing waves 410 and 412 in an at least partially enclosed space 414 at mutually exclusive and mutually alternating times, standing waves 410 and 412 being mutually distinguishable by having mutually distinct frequencies.

As further shown in FIG. 4, receiver 402, communicating with transmitter 404, is operable to toggle between receiving each of two reflected electromagnetic signals 422 and 424 corresponding to the reflected energy of each of respective standing waves 410 and 412, and to thereby provide each of electromagnetic signals 422 and 424 to a corresponding one of two amplifiers 432 and 434 which in turn are operative to produce corresponding amplified signals 442 and 444.

A first of amplifiers 432 and 434, such as amplifier 432, preferably has a constant amplifying gain, while a second of amplifiers 432 and 434, such as amplifier 434, has a controlled amplifying gain. Amplifiers 432 and 434 are preferably operative to send amplified signals 442 and 444 to a differential amplifier 450, differential amplifier 450 having restricted band pass characteristics. The restricted bandwidth of the differential amplifier 450 generally corresponds to the frequencies typically generated by a moving person.

Differential amplifier 450 is preferably operative to process amplified signals 442 and 444 for producing an output signal 452, which output signal 452 is provided by differential amplifier 450 to an AGC block 460. AGC block 460, in turn, is operative to employ output signal 452 for generating a feedback voltage 462, which feedback voltage 462 is then preferably provided by AGC block 460 to amplifier 434. Feedback voltage 462 provided to amplifier 434 is operative to control the amplification of signal 424 by amplifier 434, which then iteratively produces corresponding amplified signals 444 having varied amplitudes. Varied amplified signals 444 are in turn iteratively sent to differential amplifier 450, which is operative to iteratively attempt to balance amplified signals 442 and 444 produced by amplifiers 432 and 434.

It is appreciated that in a case wherein enclosed space 414 does not include any moving objects, signals 442 and 444 can be iteratively balanced over time by differential amplifier 450 and AGC block 460. Contrarily, in a case wherein enclosed space 414 does include at least one moving object, signals 442 and 444 cannot be balanced over time, as the reaction time of AGC block 460 is typically much slower than the fluctuation of reflected signals 422 and 424 produced by a moving object. Therefore, to ascertain whether there is a moving object within the enclosed space, a differential signal comprising a difference between signals 442 and 444 is preferably compared, by processor 400, with a predetermined threshold. In a case where the differential signal is greater than the predetermined threshold, processor 400 ascertains that there is a moving object within enclosed space 414.

Reference is now made to FIG. 5, which is a simplified flowchart illustration of steps in the operation of a computerized signal processor which is part of the system of FIGS. 1A-4.

As shown in FIG. 5, at least one transmitter communicating with a receiver repeatedly produces two mutually distinguishable standing waves in an at least partially enclosed space at mutually exclusive and mutually alternating times, the standing waves being mutually distinguishable by having mutually distinct frequencies (500).

As further shown in FIG. 5, the receiver, communicating with the transmitter, toggles between receiving each of two electromagnetic signals corresponding to the reflected energy of each of the standing waves (502). Thereafter, the receiver provides each of the electromagnetic signals to a corresponding one of two amplifiers (504) which in turn produce corresponding amplified signals (506). A first one of the amplifiers preferably has a constant amplifying gain, while a second of one of the amplifiers has a controlled amplifying gain.

The amplifiers then send the amplified signals to a differential amplifier which preferably has restricted band pass characteristics (508). The restricted bandwidth of the differential amplifier generally corresponds to the frequencies typically generated by a moving person.

The differential amplifier then processes the amplified signals to produce an output signal (510) which is then provided by the differential amplifier to an AGC block (512). The AGC block then employs the output signal to generate a feedback voltage (514), which feedback voltage is then preferably provided by the AGC block to the second of one of the amplifiers which has a controlled amplifying gain (516).

The second of one of the amplifiers then employs the feedback voltage to regulate the amplification thereof and to thereby produce corresponding amplified signals having varied amplitudes (518). The varied amplified signals are in turn iteratively sent by the second amplifier to the differential amplifier (520), which then iteratively attempts to balance the amplified signals (522).

It is appreciated that in a case wherein the enclosed space does not include any moving objects, the amplified signals can be iteratively balanced over time by the differential amplifier and the AGC block. Contrarily, in a case wherein the enclosed space does include at least one moving object, the amplified signals cannot be balanced over time, as the reaction time of AGC block is typically much slower than the fluctuation of reflected signals produced by a moving object. Therefore, to ascertain whether there is a moving object within the enclosed space, a differential signal comprising a difference between the signals is preferably compared, by a processor, with a predetermined threshold (524). In a case where the differential signal is greater than the predetermined threshold, the processor ascertains that there is a moving object within enclosed space (526). It is appreciated that in such a case, and alert may be generated and sent to a user of the system (528).

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for detecting a change in position of at least one object within an at least partially enclosed space, the system comprising:
at least one stationary transmitter repeatedly producing at least two mutually distinguishable standing waves in said at least partially enclosed space at mutually exclusive and mutually alternating times;
at least one stationary receiver receiving reflected energy of said at least two mutually distinguishable standing waves, said reflected energy from said at least two mutually distinguishable standing waves having mutually different amplitudes which have a difference therebetween; and
a computerized processor receiving outputs from said at least one stationary receiver, said outputs corresponding to said received reflected energy of said at least two mutually distinguishable standing waves, and calculating changes in said difference between said mutually different amplitudes, said changes in said difference between said mutually different amplitudes indicating said change in position of said at least one object.

2. A system according to claim 1 and wherein said at least one transmitter comprises two transmitters operative to transmit on at least two different frequencies.

3. A system according to claim 1 and wherein said at least one transmitter comprises two distinct transmitters.

4. A system according to claim 1 and wherein said at least two mutually distinguishable standing waves are transmitted in two mutually exclusive directions.

5. A system according to claim 1 and wherein said at least two mutually distinguishable standing waves are transmitted in a single direction.

6. A system according to claim 1 and wherein each of said at least two mutually distinguishable standing waves produces a corresponding interference pattern with said at least one object.

7. A system according to claim 1 and wherein said at least one receiver is operable for communicating with said at least one transmitter and is also operable to toggle between receiving each of two electromagnetic signals corresponding to reflected energy of said at least two mutually distinguishable standing waves.

8. A system according to claim 7 and wherein said at least one receiver is also operable for providing each of said two electromagnetic signals to a corresponding one of two amplifiers, wherein said two amplifiers are operable for producing corresponding amplified signals corresponding to said electromagnetic signals.

9. A system according to claim 8 and wherein a first amplifier of said two amplifiers has a constant amplifying gain, and a second amplifier of said amplifiers has a controlled amplifying gain.

10. A system according to claim 9 and wherein said two amplifiers are operable for sending said amplified signals to a differential amplifier, wherein said differential amplifier has restricted band pass characteristics.

11. A system according to claim 10 and wherein a restricted bandwidth of said differential amplifier corresponds to frequencies generated by a moving person.

12. A system according to claim 10 and wherein said differential amplifier is operable for processing said amplified signals to produce an output signal, said output signal being provided by said differential amplifier to an AGC block.

13. A system according to claim 12 and wherein said AGC block is operable for employing said output signal for generating a feedback voltage, said feedback voltage being provided by said AGC block to said second amplifier.

14. A system according to claim 13 and wherein said feedback voltage provided to said second amplifier is operative to control an amplification of a corresponding one of said two electromagnetic signals by said second amplifier, wherein said second amplifier then iteratively produces varied amplified signals having varied amplitudes.

15. A system according to claim 14 and wherein said varied amplified signals are iteratively sent to said differential amplifier, said differential amplifier being operative to iteratively balance said amplified signals produced by said amplifiers.

16. A system according to claim 15 and wherein a reaction time of said AGC block is slower than a fluctuation of said two electromagnetic signals produced by movement of said moving object.

17. A method for detecting a change in position of at least one object within an at least partially enclosed space, the method comprising:
- repeatedly producing, by at least one stationary transmitter, at least two mutually distinguishable standing waves in said at least partially enclosed space at mutually exclusive and mutually alternating times;
- receiving, by at least one stationary receiver, reflected energy of said at least two mutually distinguishable standing waves, said reflected energy from said at least two mutually distinguishable standing waves having mutually different amplitudes which have a difference therebetween; and
- receiving outputs from said at least one stationary receiver, said outputs corresponding to said received reflected energy of said at least two mutually distinguishable standing waves, and calculating changes in said difference between said mutually different amplitudes, said changes in said difference between said mutually different amplitudes indicating said change in position of said at least one object.

18. A method according to claim 17 and wherein said at least one transmitter comprises two transmitters operative to transmit on at least two different frequencies.

19. A method according to claim 17 and wherein said at least one transmitter comprises two distinct transmitters.

20. A method according to claim 17 and wherein said at least two mutually distinguishable standing waves are transmitted in two mutually exclusive directions.

21. A method according to claim 17 and wherein said at least two mutually distinguishable standing waves are transmitted in a single direction.

22. A method according to claim 17 and wherein each of said at least two mutually distinguishable standing waves produces a corresponding interference pattern with said at least one object.

23. A method according to claim 17 and wherein said at least one receiver is operable for communicating with said at least one transmitter and is also operable to toggle between receiving each of two electromagnetic signals corresponding to reflected energy of said at least two mutually distinguishable standing waves.

24. A method according to claim 23 and wherein said at least one receiver is also operable for providing each of said two electromagnetic signals to a corresponding one of two amplifiers, wherein said two amplifiers are operable for producing corresponding amplified signals corresponding to said electromagnetic signals.

25. A method according to claim 24 and wherein a first amplifier of said two amplifiers has a constant amplifying gain, and a second amplifier of said amplifiers has a controlled amplifying gain.

26. A method according to claim 25 and wherein said two amplifiers are operable for sending said amplified signals to a differential amplifier, wherein said differential amplifier has restricted band pass characteristics.

27. A method according to claim 26 and wherein a restricted bandwidth of said differential amplifier corresponds to frequencies generated by a moving person.

28. A method according to claim 26 and wherein said differential amplifier is operable for processing said amplified signals to produce an output signal, said output signal being provided by said differential amplifier to an AGC block.

29. A method according to claim 28 and wherein said AGC block is operable for employing said output signal for generating a feedback voltage, said feedback voltage being provided by said AGC block to said second amplifier.

30. A method according to claim 29 and wherein said feedback voltage provided to said second amplifier is operative to control an amplification of a corresponding one of said two electromagnetic signals by said second amplifier, wherein said second amplifier then iteratively produces varied amplified signals having varied amplitudes.

31. A method according to claim 30 and wherein said varied amplified signals are iteratively sent to said differential amplifier, said differential amplifier being operative to iteratively balance said amplified signals produced by said amplifiers.

32. A method according to claim 31 and wherein a reaction time of said AGC block is slower than a fluctuation of said two electromagnetic signals produced by movement of said moving object.

33. A system for detecting a change in position of at least one object within an at least partially enclosed space, the system comprising:
- at least one transmitter repeatedly producing at least two mutually distinguishable standing waves in said at least partially enclosed space at mutually exclusive and mutually alternating times;
- at least one receiver operable for:
  - receiving reflected energy of said at least two mutually distinguishable standing waves, said reflected energy from said at least two mutually distinguishable standing waves having mutually different amplitudes which have a difference therebetween;
  - toggling between receiving each of two electromagnetic signals corresponding to said reflected energy from said at least two mutually distinguishable standing waves; and
  - providing each of said two electromagnetic signals to a corresponding one of two amplifiers, wherein said two amplifiers are operable for producing corresponding amplified signals corresponding to said electromagnetic signals, a first amplifier of said two amplifiers having a constant amplifying gain, and a second amplifier of said amplifiers having a controlled amplifying gain; and
- a computerized processor receiving outputs from said at least one receiver and calculating changes in said difference between said mutually different amplitudes, which changes indicate said change in position of said at least one object.

34. A system according to claim 33 and wherein said at least one transmitter comprises two transmitters operative to transmit on at least two different frequencies.

35. A system according to claim 33 and wherein said at least one transmitter comprises two distinct transmitters.

36. A system according to claim 33 and wherein said at least two mutually distinguishable standing waves are transmitted in two mutually exclusive directions.

37. A system according to claim 33 and wherein said at least two mutually distinguishable standing waves are transmuted in a single direction.

38. A system according to claim 33 and wherein each of said at least two mutually distinguishable standing waves produces a corresponding interference pattern with said at least one object.

39. A system according to claim 33 and wherein said at least one receiver is operable for communicating with said at least one transmitter.

40. A system according to claim 33 and wherein said two amplifiers are operable for sending said amplified signals to a differential amplifier, wherein said differential amplifier has restricted band pass characteristics.

41. A system according to claim 40 and wherein a restricted bandwidth of said differential amplifier corresponds to frequencies generated by a moving person.

42. A system according to claim 40 and wherein said differential amplifier is operable for processing said amplified signals to produce an output signal, said output signal being provided by said differential amplifier to an AGC block.

43. A system according to claim 42 and wherein said AGC block is operable for employing said output signal for generating a feedback voltage, said feedback voltage being provided by said AGC block to said second amplifier.

44. A system according to claim 43 and wherein said feedback voltage provided to said second amplifier is operative to control an amplification of a corresponding one of said two electromagnetic signals by said second amplifier, wherein said second amplifier then iteratively produces varied amplified signals having varied amplitudes.

45. A system according to claim 44 and wherein said varied amplified signals are iteratively sent to said differential amplifier, said differential amplifier being operative to iteratively balance said amplified signals produced by said amplifiers.

46. A system according to claim 45 and wherein a reaction time of said AGC block is slower than a fluctuation of said two electromagnetic signals produced by movement of said moving object.

47. A method for detecting a change in position of at least one object within an at least partially enclosed space, the method comprising:
repeatedly producing, by at least one transmitter, at least two mutually distinguishable standing waves in said at least partially enclosed space at mutually exclusive and mutually alternating times;
receiving, by at least one receiver, reflected energy of said at least two mutually distinguishable standing waves, said reflected energy from said at least two mutually distinguishable standing waves having mutually different amplitudes which have a difference therebetween;
toggling, by said at least one receiver, between receiving each of two electromagnetic signals corresponding to said reflected energy from said at least two mutually distinguishable standing waves;
providing, by said at least one receiver, each of said two electromagnetic signals to a corresponding one of two amplifiers, wherein said two amplifiers are operable for producing corresponding amplified signals corresponding to said electromagnetic signals, a first amplifier of said two amplifiers having a constant amplifying gain, and a second amplifier of said amplifiers having a controlled amplifying gain; and
receiving outputs from said at least one receiver and calculating changes in said difference between said mutually different amplitudes, which changes indicate said change in position of said at least one object.

48. A method according to claim 47 and wherein said at least one transmitter comprises two transmitters operative to transmit on at least two different frequencies.

49. A method according to claim 47 and wherein said at east one transmitter comprises two distinct transmitters.

50. A method according to claim 47 and wherein said at least two mutual distinguishable standing waves are transmitted in two mutually exclusive directions.

51. A method according to claim 47 and wherein said at least two mutually distinguishable standing waves are transmitted in a single direction.

52. A method according to claim 47 and wherein each of said at least two mutually distinguishable standing waves produces a corresponding interference pattern with said at least one object.

53. A method according to claim 47 and wherein said at least one receiver is operable for communicating with said at least one transmitter.

54. A method according to claim 53 and wherein said two amplifiers are operable for sending said amplified signals to a differential amplifier, wherein said differential amplifier has restricted band pass characteristics.

55. A method according to claim 54 and wherein a restricted bandwidth of said differential amplifier corresponds to frequencies generated by a moving person.

56. A method according to claim 54 and wherein said differential amplifier is operable for processing said amplified signals to produce an output signal, said output signal being provided by said differential amplifier to an AGC block.

57. A method according to claim 56 and wherein said AGC block is operable for employing said output signal for generating a feedback voltage, said feedback voltage being provided by said AGC block to said second amplifier.

58. A method according to claim 57 and wherein said feedback voltage provided to said second amplifier is operative to control an amplification of a corresponding one of said two electromagnetic signals by said second amplifier, wherein said second amplifier then iteratively produces varied amplified signals having varied amplitudes.

59. A method according to claim 58 and wherein said varied amplified signals are iteratively sent to said differential amplifier, said differential amplifier being operative to iteratively balance said amplified signals produced by said amplifiers.

60. A method according to claim 59 and wherein a reaction time of said AGC block is slower than a fluctuation of said two electromagnetic signals produced by movement of said moving object.

* * * * *